G. W. Dalby,
Thread Guard.
No. 90,155. Patented May 18. 1869.

Witnesses:
Gustave Dieterich
John F. Brooks

Inventor:
G. W. Dalby.
Per Munn & Co.
Att'ys.

United States Patent Office.

GEORGE W. DALBEY, OF CARROLLTON, MISSISSIPPI.

*Letters Patent No. 90,155, dated May 18, 1869.*

IMPROVED THREAD-GUARD.

The Schedule referred to in these Letters Patent and making part of the same.

*To all whom it may concern:*

Be it known that I, GEORGE W. DALBEY, of Carrollton, in the county of Carroll, and State of Mississippi, have invented a new and useful Improvement in Thread-Guards; and I do hereby declare that the following is a full, clear, and exact description thereof, which will enable others skilled in the art to make and use the same, reference being had to the accompanying drawings, forming part of this specification.

This invention relates to a new and useful improvement in an article for female use, and consists in a cylindrical guard for enclosing a spool of thread, the cylinder being parted or cut, so as to spring around the spool, and with its edge notched, so as to form a cutter for the thread, as will be hereinafter described.

In the accompanying sheet of drawings—

Similar letters of reference indicate corresponding parts.

Figure 1:
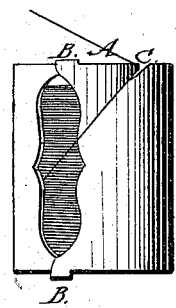
Figure 1 represents the guard enclosing the spool, the guard being formed so as to lap over at the ends of the spool.
Figure 3:
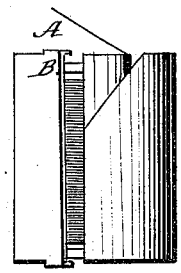
Figures 3 and 4 represent end views of the same, showing the lips which hold the spools.
Figure 2:
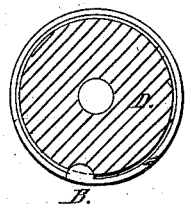
Figure 2 is a modification where the edges do not lap, it being a plain-cut cylinder. In the former, the thread on the spool is seen in red color; in the latter, it is seen in blue color.
Figure 4:
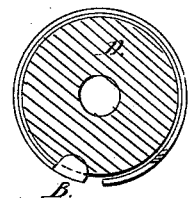

A represents the guards, which are longitudinal sections of an open cylinder, with lips B at each end, for holding the spool, as seen in the drawing. In fig. 1 the parts lap over, so as to prevent the thread from running off the spool.

C represents the notch, the shoulder of which is a cutting-edge for severing the thread.

D is the spool.

This guard is readily opened, so as to prevent the lips B from interfering with the spool where it is inserted. The guards spring over and secure it, so that while the spool cannot slip from the guard, it may freely revolve as the thread is drawn off. The guard protects the thread, keeps it clean, and prevents its unwinding and becoming tangled, beside affording ready means for cutting the thread.

Having thus described my invention,

I claim as new, and desire to secure by Letters Patent—

The guard A, with the lips B and the cutters C, arranged substantially as and for the purposes herein shown and described.

The above specification of my invention signed by me, this 24th day of February, 1869.

GEO. W. DALBEY.

Witnesses:
 JOHN S. KENT,
 JOHN MOWRY.